Figure 1:
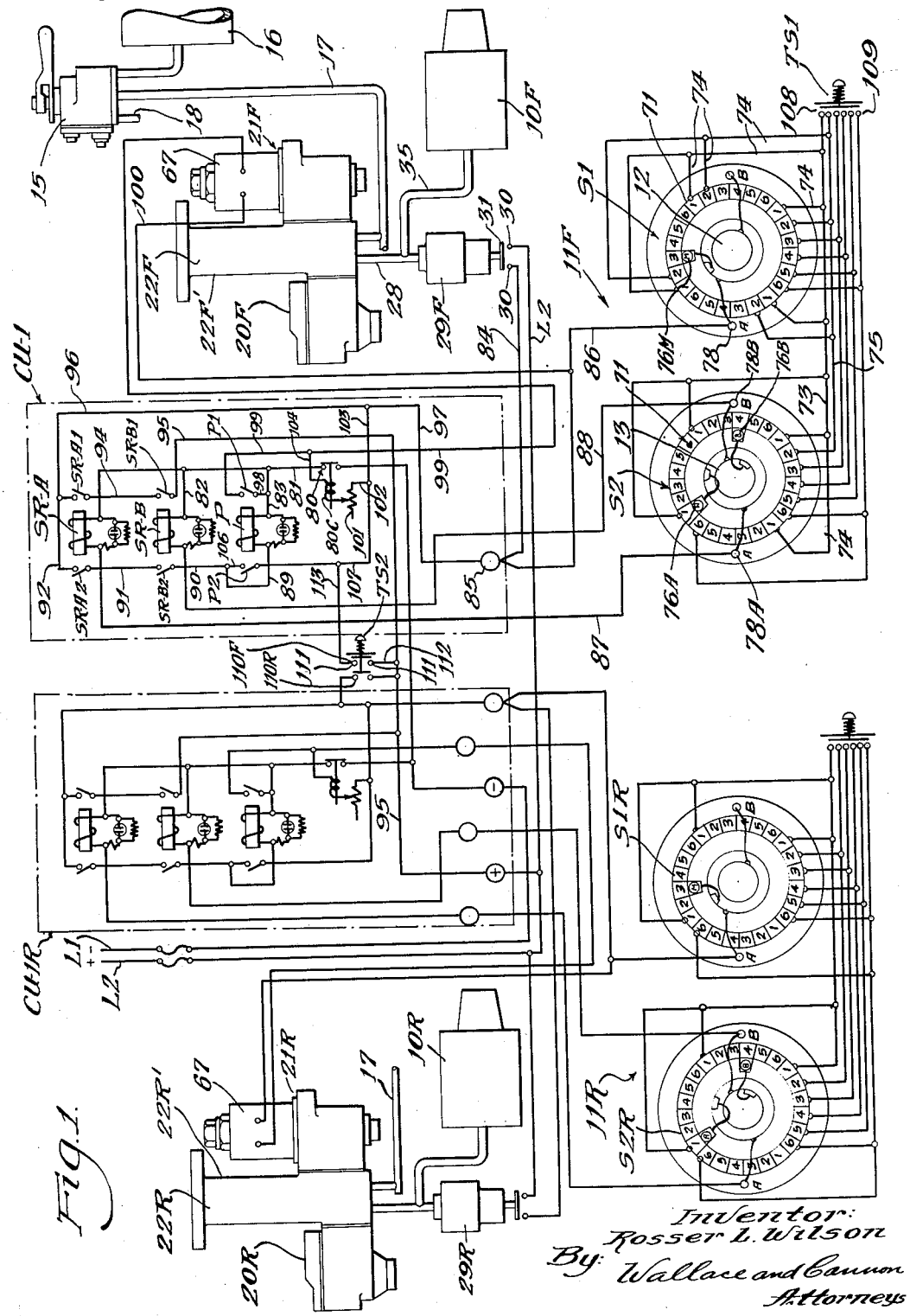

June 13, 1950 R. L. WILSON 2,511,389
CONTROL APPARATUS
Filed Sept. 24, 1948 2 Sheets-Sheet 1

Inventor:
Rosser L. Wilson
By Wallace and Cannon
Attorneys

Patented June 13, 1950

2,511,389

UNITED STATES PATENT OFFICE 2,511,389

CONTROL APPARATUS

Rosser L. Wilson, Mahwah, N. J., assignor to American Brake Shoe Company, New York, N. Y., a corporation of Delaware Application September 24, 1948, Serial No. 51,071

4 Claims. (Cl. 188—181)

This invention relates to control apparatus for railway and like equipment, and particularly it relates to apparatus for controlling the effectiveness of railway braking and like equipment for the purpose of preventing sliding of the wheels during braking operations.

Among the expedients to which resort has been made heretofore to prevent sliding of the wheels of railway and like equipment during braking or other operations are those which embodied elements mounted in close association with one or more of the wheels for operation by or rotation with such wheel or wheels. The elements so associated with the wheels of the equipment may constitute all or merely part of a detecting means operable to sense an operating condition indicative of at least an incipient wheel sliding condition, and such detecting means have been operative to institute a control operation to prevent or alleviate wheel sliding. Such a control operation, for example, may constitute effecting a reduction in the braking pressure or a short period of release of the braking pressure, which tends to alleviate the undesirable tendency toward sliding of the wheels or actual sliding of the wheels.

In my prior United States Letters Patent Nos. 2,232,750, 2,232,751 and 2,232,752, all patented February 25, 1941, No. 2,272,872, patented February 10, 1942, and No. 2,320,809, patented June 1, 1943, I have disclosed control apparatus that is effective to compare the speeds of the two wheels or axles of a truck on railway equipment, and when the speed of the two compared wheels varies beyond an objectionable limit or tolerance, such apparatus is effective to release the air pressure in the related brake cylinder so that the wheels may return to a normal rolling condition. In most instances, the control apparatus disclosed in my aforesaid prior patents is of such a character that release or reduction of the braking pressure is allowed to proceed for a predetermined maximum length of time, each time an objectionable speed difference is detected between the railroad wheels or axles, and in most instances where the braking apparatus is operating in an appropriate and satisfactory manner, the aforesaid control apparatus is effective to cause the wheels to return to a normal free rolling condition. In any event, the detecting operation is accomplished in a repeated manner in control apparatus of the aforesaid prior patents, so that in the event the wheels do not return to the desired free rolling relationship as the result of one control operation, this condition will again be detected and one or more successive pressure releasing or pressure reducing operations will be performed so as to thereby reestablish the normal free rolling condition of the wheels and enable the normal braking operation to proceed in respect to such wheels.

In the use of control apparatus of the aforesaid character on railway and like equipment, it is, of course, desirable to minimize the time required to return the wheels to a free rolling condition, thereby to enable the actual brake application in respect to such wheels to proceed with a minimum of inactive time such as that which is incident to such successive brake releasing operations as above described. In connection with this I have discovered that overall braking efficiency is promoted by insuring that the initial control operation in which the braking pressure is released or reduced will be effective to invariably cause the wheels to return to their free rolling condition, and to enable this to be done in a simple and expeditious manner is the primary object of the present invention. More specifically, it is an object of the present invention to enable such a control or pressure releasing operation to be instituted under control of detecting means that compare with the speeds of the related wheels of the railway or like equipment, and to enable the continuation of such control operation to be governed by the pressure in the brake cylinder that is being vented. More specifically, it is an object to enable such a control operation to be instituted by detecting means that compare the speeds of the related wheels and to enable such a control operation to be continued until the braking pressure has been reduced to a predetermined level at which the brakes will in every instance be fully released so as to thereby assure that the wheels will return to their free rolling speed and become available for resumption of an effective braking relation.

Other and further objects of the present invention will be apparent from the following description and claims and are illustrated in the accompanying drawings which, by way of illustration, show a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

Figure 2:
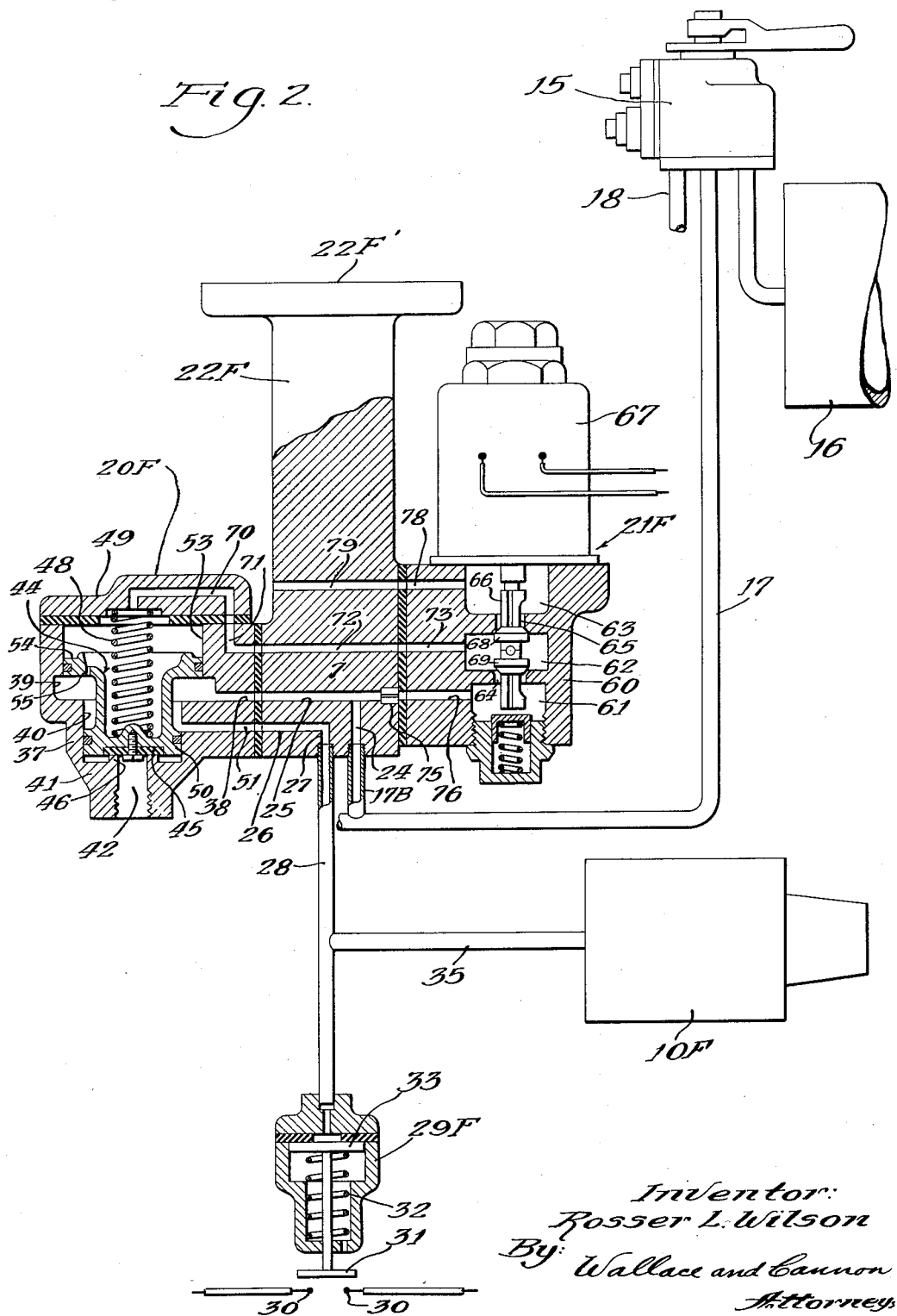

In the drawings:

Fig. 1 is a schematic wiring diagram illustrating control apparatus embodying the features of the invention; and Fig. 2 is an enlarged portion of Fig. 1 illustrating features of internal construction of certain of the elements thereof.

The invention disclosed is applicable to and is intended for use in connection with standard fluid pressure brake equipment for railway cars and trains. However, for simplicity of disclosure, the brake equipment shown in the drawings is of the simple and well known straight-air type. The control apparatus is illustrated in Fig. 1 as associated with brake cylinders 10F and 10R such as are utilized in conventional railway equipment for applying the brakes to front and rear trucks 11F and 11R of a railway car or the like. Each truck 11F and 11R embodies a pair of axles 12 and 13 and the speeds of the axles 12 and 13 of each truck are compared and rendered effective to initiate the release of braking pressure from the associated brake cylinder 10F or 10R when one of the axles varies in an objectionable amount from the speed of the other of the two axles.

The fluid pressure brake equipment shown comprises a fluid pressure supply reservoir 16, a straight-air or control pipe 17, a self-lapping brake valve 15, brake cylinders 10F and 10R and electro-responsive control valves 22F' and 22R'. The supply of pressure air to the brake cylinders 10F and 10R is accomplished primarily under the control of the manual control valve 15 that may be of the kind illustrated in United States Letters Patent No. 2,208,737. The manual control valve 15 is arranged to govern pressure air from a suitable supply source such as the main pressure tank 16, and the pressure from the tank 16 is supplied to the main brake control or straight-air pipe 17 that extends from end to end of the car. Pressure from the pipe 17 may be discharged or vented at the will of the operator through a main vent 18. This conventional manual control valve 15 is of the self-lapping type and it is effective to bring about application or release of the brakes. The valve is also effective to control the degree of application of the brakes so as to thereby bring about a braking operation in accordance with the particular conditions encountered, and the degree of application of the brakes is governed by causing different pressures to be supplied from the main supply tank 16 to the control pipe 17 under control of the manual valve 15.

With respect to each of the brake cylinders 10F and 10R, a control means in the nature of an electro-responsive control valve is provided through which air pressure from the control pipe 17 is supplied to the related brake cylinder. Thus, an electro-responsive control valve 22F' is associated with the front brake cylinder 10F while an electro-responsive control valve 22R' is associated with the rear brake cylinder 10R. These two control valves are of identical construction and the details of construction thereof are illustrated in Fig. 2 of the drawings. Each of the control valves is normally arranged to permit free passage of pressure air from the control pipe to the associated brake cylinder, but the control valve is also under the dominating control of a solenoid operated valve mechanism which, in respect to the control valve 22F', is identified as a magnetic valve 21F. Each control valve, as 22F', includes a vent valve 20F, and this vent valve 20F and the magnet valve 21F are mounted on opposite sides of a common hanger or pipe bracket 22F through which proper connections are established between the vent valve 20F and the valve elements of the magnet valve 21F. Thus a branch pipe 17B from the control pipe 17 connects with the lower end of the vertical passage 24 formed in the bracket 22F, and the vertical passage 24 terminates in a transverse passage 25. The hanger or pipe bracket 22F also has a horizontal passage 26 extended therein from the left hand face of the bracket, and this passage terminates in a vertical passage 27 which extends downwardly and is connected to a pipe 28. The other end of this pipe has a pressure operated switch 29F associated therewith, this switch having stationary contacts 30 and a pressure operated cross bar contact 31 that is normally separated from the stationary contacts 30 by the action of a spring 32 housed within the casing of the switch 29F. The relationship is preferably such that a pressure of substantially five pounds per square inch in the pipe 28 will be effective on a piston 33 to shift the switch member 31 against the action of the spring 32 and into such a relationship that the switch is closed. The switch thus remains closed until the pressure is reduced below five pounds per square inch. A branch pipe 35 extended from the pipe 28 is connected to the brake cylinder 10F so that pressure in the pipe 28 will be transmitted to the brake cylinder 10F.

The vent valve 20F comprises a valve casing 37 that is secured in a conventional manner against the left hand face of the bracket 22F, and when the vent valve 20F is secured in this position, the air supply passage 25 in the bracket is connected with a passage 38 formed in the valve casing 37. This passage 38 opens into a relatively large annular chamber 39. Beneath the chamber 39, a relatively large cylinder portion 40 is formed which extends downwardly and terminates in a lower wall 41 of the valve casing and in this lower wall 41, a main vent opening 42 is provided which constitutes the vent opening for the vent valve. Within the cylinder portion 40 of the valve casing, a vertically slidable valve member 44 is mounted and at its lower end this valve member 44 has a seating portion 45 that is adapted to be moved downwardly to a lower or closed position wherein it engages with an annular rim 46 formed about the upper end of the vent passage 42. A spring 48 acting between the valve member 44 and a top cover 49 of the valve casing serves normally to hold the valve member 44 in its lower or closed position wherein it closes the vent 42 as shown in Fig. 2. At its lower end and above the seating portion 45, the valve member has a flange 50 that rides against the wall of the cylinder 40 and which, when the valve is in its lower position of Fig. 2, is disposed below the lower side of a transverse passage 51 that extends to the right from the cylinder 40 and connects with the passage 26. Thus, when the valve member 44 is in its lower position of Fig. 2, air pressure from the main control pipe 17 is transmitted through the passages 24, 25, 38, 40, 51, 26 and 27 to the pipe 28, thus to apply the pressure from the control pipe 17 to the brake cylinder 10F.

When the brake cylinder 10F is to be vented under control of the magnet valve 21F, this is accomplished by venting a normally applied air pressure from the top of the valve 44. Thus the valve casing 37 has a relatively large cylinder 53 formed therein above the chamber 39 and concentrically with relation to the cylinder 40. A flange 54 on the upper end of the valve member truck 11F, and this relay panel also includes a power relay P which serves to control the energizing circuit for the solenoid 67 as will hereinafter be described. The relay SR—A has normally open relay contacts SR—A1 and SR—A2, while the relay SR—B has normally open relay contacts SR—B1 and SR—B2. Similarly, the power control relay P has normally open relay contacts P1 and P2.

Power for the electrical circuits is supplied from line wires L1 and L2 and the line wire L1 is connected directly to one terminal of a protective cutout switch 80 that serves as a protective safety device as will hereinafter be described, and which normally occupies a closed relationship. This closed relationship of the protective switch 80 extends the circuit to a wire 81 which is connected to one terminal of the relay SR—A. Branch leads 82 and 83 are extended from the wire 81 to one terminal of the relays SR—B and P, respectively.

The line wire L2 is connected to one contact 30 of the pressure switch 29F, and a wire 84 from the other terminal of this switch is extended to a terminal 85 in the relay panel CU—1 so that when pressure above a predetermined low level such as five pounds per square inch is applied to the pressure switch 29F, power from the line wire L2 will be extended to the terminal 85.

The power is extended from terminal 85 through a wire 86 to the terminal 78 of the commutator S1, thereby to extend this side of the circuit to the master brush 76M. Hence, the circuit may be extended from any commutator bar 71 with which the brush 76M is engaged to the correspondingly numbered commutator bars in the switch S2, and from the commutator bars of the switch S2 that are thus energized, circuit may be extended through either one of the brushes 76A or 76B that comes into engagement with such an energized commutator bar. Thus the brush 76A may extend circuit from such a commutator bar to the terminal 78A, and a wire 87 from the terminal 78A extends circuit to the other terminal of the relay SR—A. Similarly, a wire 88 extended from the terminal 78B extends to the other terminal of the relay SR—B and hence, when there is relative rotation of the shaft or axles 12 and 13, the relays SR—A and SR—B will be alternately energized at intervals that will decrease as the relative speed of the axles 12 and 13 increases.

As explained in my aforesaid prior patents, the release time of the relays SR—A and SR—B is adjusted and determined with reference to the commutator connections and the spacing of the brushes 76A and 76B so that so long as the speed difference is within an unobjectionable tolerance, each of the relays SR—A and SR—B will release prior to the operation or energization of the other of these two relays. However, when the speed difference between the axles 12 and 13 exceeds the allowable tolerance, the release period of the two relays SR—A and SR—B will exceed the interval between the periods of energization, and hence both of these relays will be operated simultaneously. When this occurs, an initial energizing circuit is afforded for the power relay P. Thus a wire 89 is extended from the other terminal of the relay P to a wire 90 that connects one of the contacts P2 with one of the contacts SR—B2. A wire 91 connects the other of the contacts SR—B2 with one of the contacts SR—A2, the other of the contacts SR—A2 being connected by a wire 92 to one of the contacts SR—A1. The other of the contacts SR—A1 is connected by a wire 94 to one of the contacts SR—B1, while the other of the contacts SR—B1 is connected by a wire 95 to the line wire L2. The wire 92 is also connected by wires 96 and 97 in series to the terminal 85, so that the initial energizing circuit for the power relay P has two alternate or parallel branches, one of which is dependent upon closure of the pressure switch 29F while the other is dependent upon concurrent closure of the contacts SR—A1 and SR—B1. Thus, in the course of a braking operation, when the pressure switch 29F is closed, the energizing circuit for the power relay P through one of the aforesaid parallel branches is extended from the line wire L2 through the contacts 30 and 31 of the pressure switch, the wire 84, the terminal 85, the wires 97, 96 and 92 to the relay contacts SR—A2, the wire 91, the relay contacts SR—B2 and the wires 90 and 89 to one terminal of the power relay, the circuit on the other side of the power relay P being extended through the wires 83 and 81, the normally closed protective switch 80, and thus back to the line wire L1. The other alternate branch including the contacts SR—A1 and SR—B1 constitutes a safety circuit which, as will hereinafter be described, contributes in several ways to uniformity of operation of the apparatus. Thus this alternate or branch circuit insures continuity of brake release in the event that the concurrent operation of the relays SR—A and SR—B at the time when the pressure switch 29F opens indicates continued presence of a wheel slipping condition, and it also insures operation of the safety cutout switch 80 in the event that the relays SR—A and SR—B remain concurrently closed after opening of the pressure switch 29F, and for example, due to failure of such relays, or the presence of short circuits.

When the power relay P is thus energized, closure of the relay contacts P1 serves to complete an energizing circuit for the solenoid 67 of the magnet valve 21F. Thus a wire 98 extends from the wire 83 to one of the relay contacts P1, while a wire 99 extends from the other of these contacts to one terminal of the solenoid 67. A wire 100 extended from the other terminal of the solenoid 67 is connected to the wire 86 so that the solenoid 67 will be energized during concurrent closure of the pressure switch 29F, and the protective switch 80. This protective switch is in the nature of a slow-to-operate relay and operates in the general manner disclosed in my prior Patent No. 2,272,872, patented February 10, 1942, and the arrangement is such that the contacts remain in their open position after a protective operation, and require manual reclosure. Thus the protective switch 80 has an operating coil 80C which is connected through an adjustable resistor 101 and wires 102 and 103 to the wire 96, the other terminal of the operating coil being connected by a wire 104 to the wire 99. Hence, when the power relay P1 remains energized for an objectionably long period, as described in my aforesaid Patent No. 2,272,872, the operating coil 80C thereof will serve to move the protective switch 80 to its open relationship wherein the relay coils of all of the relays in the panel CU—1 will be rendered ineffective, and the circuit to the solenoid 67 will be broken so as to thereby cause reapplication of the brakes on the front truck 11F.

After a control operation has been initiated as hereinabove described, the period of release of the brakes would, in accordance with my prior 44 rides in the cylinder 53, and a small equalizing passage 55 formed in the flange 54 serves to equalize the pressures gradually on opposite sides, that is, above and below the flange 54.

The magnet valve 21F includes a valve body 60 having a lower chamber 61, an intermediate chamber 62 and an upper chamber 63, and a passage 64 is formed between the chambers 61 and 62, while a passage 65 is formed between the chamber 62 and the chamber 63. A valve stem 66 extends through the two passages 64 and 65 and is connected at its upper end to the armature of an operating solenoid or magnet 67. The arrangement is such that the valve stem 66 is normally urged in an upward direction to the position shown in Fig. 2, and when in this position, a valve member 68 on the valve stem 66 closes the passage 65. A valve member 69 also carried on the stem 66 is so disposed in the chamber 62 that when the solenoid 67 is operated, the valve member 68 is being moved down so as to open the passage 65. This relationship is utilized in causing the brake cylinder to be vented in response to operation of the solenoid 67. Thus, the cover 49 of the vent valve 29F has a passage 70 formed therein from the upper cylinder 53, and this passage is extended through the valve casing 37 by a passage 71, and the passage 71 connects to a transverse passage 72 formed in the pipe hanger 22F. A passage 73 formed in the valve body 60 connects the passage 72 to the intermediate chamber 62 of the valve, and when the valve member or stem 66 is in its normal position, the air pressure from the lower chamber 61 is transmitted through the open passage 64 and to the upper end of the valve 44 of the vent valve. The pressure from the control pipe 17 is transmitted to the chamber 61 through a relatively small choke fitting 75 disposed in the right hand end of the passage 25, and this choke is connected through a passage 76 in the valve body 60 to the chamber 61. Thus the pressure from the control pipe 17 will be applied to opposite faces of the flange 54 of the vent valve member 44, and hence the spring 48 will dominate the forces applied to the valve member 44 and will normally maintain the valve member in its lower or closed position of Fig. 2. When the solenoid 67 is energized, the valve stem 66 will be depressed and the pressure from the cylinder 53 will be released from the chamber 62 into the chamber 63, which is connected by aligned passages 78 and 79 formed respectively in the valve casing 60 and the pipe hanger 22F to afford a vent passage for the chamber 63. When the valve member 66 thus assumes its venting position, the pressure on the upper side of the flange 54 will be reduced, and as a result the valve member 44 will be shifted to an upper position wherein the flange 50 is located above the passage 51. This of course causes venting of the pressure air from the brake cylinder 10F through the vent 42. The valve 44 thus disposes the flange 50 and flange 54 thereof in such positions that loss of pressure air from control pipe 17 will be prevented, while venting of the pressure air from the brake cylinder 10F takes place, and the pressure relationships are such that the valve 44 will remain in its venting position until the solenoid 67 is deenergized or the control pipe 17 is vented by the manual control valve 15. It is to be understood that the vent valve 20F and the magnet valve 21F are conventional elements of railway braking equipment.

The vent valves 20F and 20R are, of course, governed through their respective solenoids 67, and this governing action in respect to each such vent valve is attained in a primary sense by the joint action of sensing means associated with the two axles of the related truck, such as truck 11F, and such sensing means are effective to initially energize the solenoid 67 which, under the present invention, is thereafter placed under the dominating control of the pressure switch 29F. Thus, the axles 12 and 13 have commutators S1 and S2 associated therewith in the manner that is disclosed in my aforesaid prior Patent No. 2,320,809. These commutators may be of substantially the same construction that is illustrated in such prior patent, but it will be observed that these commutators as herein illustrated have commutator segments 71 that are connected together in a somewhat different relationship. Thus, the commutators S1 and S2 as herein illustrated each have twenty-four commutator segments 71, and in Fig. 1 of the drawings, these commutator segments in each of the commutators have been designated by the identifying numbers 1 to 6 in successive groups about the periphery of the commutator. As will hereinafter become apparent, correspondingly numbered commutator segments in the two commutators are electrically connected together. Thus, with particular reference to the commutator segments identified as the No. 1 segments, a wire 73 and a plurality of branch leads 74 extend between all of these No. 1 commutator segments. Similar wires 75 and similar branch leads connect the groups of correspondingly numbered commutator segments from 2 to 6, as shown in Fig. 1 of the drawings.

The commutators S1 and S2 are generally similar in construction with the exception, however, that the commutator S1 utilizes but a single brush 76M riding on the commutator segments thereof, while the commutator S2 has a pair of angularly spaced brushes 76A and 76B that engage the commutator segments thereof. The brushes 76A and 76B are physically spaced one from the other in an angular distance of substantially 135°, but it might be pointed out that by reason of the number of commutator segments employed, and the way in which correspondingly numbered commutator segments are electrically interconnected, the effective spacing of the commutator segments in an electrical sense is equal to substantially the width of one commutator segment.

The master brush 76M of the commutator S1 is associated through a suitable slip ring arrangement with a terminal 78, while the brushes 76A and 76B are associated through individual slip ring arrangements with terminals 78A and 78B, and these terminals are utilized in affording the desired connections to a relay panel CU—1 that functions in attaining the desired controlling action in respect to the vent valve 20F.

The relay panel CU—1 as herein illustrated is associated with the front truck 11F and with the front vent valve 29F, and it might be observed that this relay panel CU—1 is duplicated as relay panel CU—1R for association with the rear truck 11R, and the axles of the rear truck are provided with commutators S1R and S2R which are of the same form and construction as the commutators hereinbefore described.

The relay panel CU—1 embodies a pair of slow-to-release relays SR—A and SR—B that function in the sensing of an objectionable speed difference between the axles 12 and 13 of the front patents, be determined by the period of concurrent closure of the relays SR—A and SR—B, or by the release period of the power relay P, but under and in accordance with the present invention, the two relays SR—A and SR—B serve to institute or initiate the control operation, and termination of the control operation is normally taken over by the pressure switch 29F so that the venting of the related brake cylinder will be continued until the pressure in the brake cylinder has been reduced to a predetermined level, such for example as five pounds per square inch. In obtaining this result, a holding circuit is afforded for the power relay P, and this holding circuit has two parallel branches, one of which includes the relay contacts SR—A1 and SR—B1 in series, while the other branch includes the contacts 30 and 31 of the pressure switch 29F. Thus one of the contacts P2 is connected by a wire 106 to the wire 89, while a wire 107 extends from the other of the relay contacts P2 to the wire 103 which is, of course, connected by the wire 97 to the terminal 85. Thus, the holding circuit extends from the line wire L2 through the contacts 30 and 31 of the pressure switch 29F, the terminal 85 and the wires 97, 103 and 107 to the relay contacts P2 and thence through the wires 106 and 89 to one terminal of the relay P, the other terminal of which is connected through the protective switch 80 to the line wire L1. The parallel branch associated with this circuit affords a shunt around the pressure swtich 29F from line wire L2 through the wire 95, the contacts SR—A1 and SR—B1 and the wire 96 to the wire 103. Hence, under normal conditions, the relays SR—A and SR—B will be concurrently energized for but a short period at the time the control is initiated and the power relay P will remain energized under control of the pressure switch 29F, and only until the pressure in the related brake cylinder has been reduced to a predetermined low level, at which time the pressure switch 29F will open the holding circuit to the power relay P. This holding circuit, of course, includes the protective switch 80 so that in the event that the desired venting of the related brake cylinder takes an unduly long period, the control operation may be terminated by the protective switch 80.

In this regard it should be observed that the coil 80C of the protective switch 80 has its energizing circuit extended from the line wire L1 through the switch 80, the wires 81, 83 and 98, through the contacts P1 and the wires 99 and 104 to one terminal of the coil 80C. From the other terminal of the coil 80C, wires 102 and 103 extend in series to parallel branch circuits, one of which includes the pressure switch 29F and the other of which includes the relay contacts SR—A1 and SR—B1 in series. Thus, one such branch comprises the wires 97 and 84 in series to the pressure switch 29F so that upon closure of the pressure switch 29F a circuit for the coil 80C is completed to the line wire L2. The other branch includes the wire 96, the contacts SR—A1, the wire 94, the contacts SR—B1 and the wire 95 to the line wire L2 so that a circuit for the coil 80C is afforded so long as the contacts SR—A1 and SR—B1 are concurrently closed.

This arrangement assures effectiveness of the safety switch 80 under all the various conditions that may arise in the use of the apparatus but also assures that detection of an objectionable speed difference, indicating a continuance of the slipping condition just prior to the opening of the pressure switch 29F, will cause an additional period of venting which will give the wheels additional time to regain their free rolling speed. This additional period will normally terminate when one or the other of the relays SR-A or SR-B opens, but in the event the power relay P is one having slow-to-release characteristics, the release period thereof will further extend the venting period. Thus the venting action continues until both the branch circuit that includes the pressure switch 29F and the branch circuit through the relay contacts SR-A1 and SR-B1 have been broken. However, continuation of the venting for an excessive period will cause the safety switch 80 to operate, thus to return the brakes to their normal braking relation under the sole control of the manual valve 15.

This arrangement under the present invention insures that a single control operation will under normal circumstances vent the brake cylinder in an amount that is normally sufficient to allow the wheels of the truck to assume a normal free rolling relationship, and hence the desired protection against wheel sliding is attained while at the same time increasing the effectiveness of the brakes in the braking operation. This increase in effectiveness is, of course, obtained by the reduction in the time required to reestablish the free rolling relationship of the wheels.

In the apparatus in Fig. 1 of the drawings, test circuits are afforded whereby the operativeness of the elements of the control apparatus may be checked in a relatively simple manner. Thus a test switch TS1 in the form of a normally open push button switch is provided for the front truck 11F. This test switch has a common movable contact 108 which is adapted to engage a plurality of stationary contacts 109 which are connected to the wires 73 and 75. Thus while the train is stationary the brakes may be applied so as to close the pressure switch 29F, thereby to connect the terminal 85 to line wire L2, and depression of the test switch TS1 will then serve to complete energizing circuits to both the relays SR—A and SR—B, which will, of course, operate the power relay P. This will, of course, energize the solenoid 67 so as to vent the brake cylinder 10F, and hence the operativeness of the system in respect to the front truck 11F will be indicated. A similar test switch is, of course, provided in association with the rear truck 11R.

While the train is in motion it is often desirable to check the operativeness of the sensing circuits and the relays SR—A and SR—B which form a part of the sensing means. For this purpose, a test switch TS2 is provided in association with the relay panels CU—1 and CU—1R. This test switch has cross bars 110F and 110R which are insulated from each other, and the cross bar 110F is adapted to be engaged with stationary contacts 111, one of which is connected by a wire 112 to the wire 95 while the other contact 111 is connected by a wire 113 to the wire 107. Similar connections are provided for the other relay panel CU—1R. Closure of the test switch TS2 affords a shunt around the related pressure switch, such as the pressure switch 29F, so that even though the brakes are not applied, the sensing operation will take place and the relays SR—A and SR—B will be energized so as to test their operativeness.

From the foregoing description it will be evident that the present invention affords control apparatus for railway and like equipment which materially reduces the possibility that flat wheels will be produced in the course of a braking operation. Moreover, it will be clear that the present invention enables the free rolling speed of the wheels in railway braking equipment to be restored more quickly than has heretofore been possible, thereby to improve the overall efficiency of the braking system in which such wheel controlling apparatus is utilized. More specifically, it will be apparent that the present invention enables the control operation or pressure releasing operation to be substantially continuous, and it enables the control operation to be initiated under the control of the speed comparing means and to be terminated in most instances under control of the air pressure in the brake cylinder that is being vented. Under and in accordance with the present invention, the foregoing advantageous results are attained in such a way that the safety control is maintained effective at all times so that the control apparatus will be disabled when improper operation is detected by such safety means.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. In a vehicle brake control apparatus for use with at least two vehicle wheels, governing means for effecting application and release of braking means for said wheels including a brake cylinder to which air under pressure is applied to effect a braking operation, normally ineffective detecting means for comparing the rotative speeds of said wheels to detect slipping, venting means disposed adjacent said brake cylinder for venting the same, pressure responsive means connected between said brake cylinder and said venting means and operable to render said detecting means effective when the pressure in said cylinder exceeds a predetermined amount, control means operable in response to detection of wheel slipping by said detecting means during a braking operation to operate said venting means, governing means governed by said pressure responsive means and rendered effective by said control means to continue operation of said venting means until the pressure in said cylinder is reduced to said predetermined amount, and means, rendered effective by said detecting means when slipping is detected in the course of operation, to maintain said venting means effective independently of said pressure responsive means and after the brake cylinder pressure has been reduced to said predetermined amount.

2. In a vehicle brake control apparatus for use with at least two vehicle wheels, manually operable governing means for effecting application and release of braking means for said wheels including a brake cylinder to which air under pressure is applied to effect a braking operation, electrically operable detecting means for comparing the rotative speeds of said wheels to detect slipping, electrically operable venting means disposed adjacent said brake cylinder for venting the same, a normally open pressure responsive switch having a pressure connection between said brake cylinder and said venting means for closing said switch only when pressure in said cylinder is above a predetermined minimum, a power circuit for said electrically operable means and including said switch so as to render said detecting means effective when the pressure in said cylinder exceeds a predetermined amount, control means operable in response to detection of wheel slipping by said detecting means during a braking operation to energize said venting means from said power circuit, shunt circuit means for said electrically operable venting means and governed by said pressure responsive means and rendered effective by said control means to continue operation of said venting means until the pressure in said cylinder is reduced to said predetermined amount, and an alternate power circuit rendered effective by said detecting means when wheel slipping is detected just prior to opening of said pressure switch to afford a continued power supply to said electrically operable means independently of said pressure switch for an added venting period.

3. In a vehicle brake control apparatus for use with at least two vehicle wheels, governing means for effecting application and release of braking means for said wheels including a brake cylinder to which air under pressure is applied to effect a braking operation, normally ineffective detecting means for comparing the rotative speeds of said wheels to detect slipping, venting means disposed adjacent said brake cylinder for venting the same, pressure responsive means connected between said brake cylinder and said venting means and operable to render said detecting means effective when the pressure in said cylinder exceeds a predetermined amount, control means operable in response to detection of wheel slipping by said detecting means during a braking operation to operate said venting means, means governed by said pressure responsive means and rendered effective by said control means to continue operation of said venting means until the pressure in said cylinder is reduced to said predetermined amount, and means, rendered effective by said detecting means when slipping is detected in the course of a braking operation, to maintain said detecting means effective independently of said pressure responsive means until wheel slipping is no longer detected.

4. In a vehicle brake control apparatus for use with at least two vehicle wheels, manually operable governing means for effecting application and release of braking means for said wheels including a brake cylinder to which air under pressure is applied to effect a braking operation, electrically operable detecting means for comparing the rotative speeds of said wheels to detect slipping, electrically operable venting means disposed adjacent said brake cylinder for venting the same, a normally open pressure responsive switch having a pressure connection between said brake cylinder and said venting means for closing said switch only when pressure in said cylinder is above a predetermined minimum, a main power circuit for said electrically operable means and including a common portion and a first and second branch portions, said first branch portion including said switch so as to render said detecting means effective when the pressure in said cylinder exceeds a predetermined amount, control means operable in response to detection of wheel slipping by said detecting means during a braking operation to energize said venting means from said power circuit, shunt circuit means for said electrically operable venting means and governed by said pressure responsive means and rendered effective by said control means to continue operation of said venting means until the pressure in said cylinder is reduced to said predetermined amount, switch means in said second branch portion of said power circuit rendered effective by said detecting means when wheel slipping is detected to afford a continued power supply to said electrically operable means independently of said pressure switch so long as a slipping condition continues, a cutout switch in said common portion of said main power circuit for disabling all of said electrically operable means when said cutout switch is open, and electrically operable actuating means for said cutout switch connected into main power circuit through said cutout switch and then by said first and second branch portions in parallel so as to energize the electrically operable actuating means of said cutout switch during closure of either of said branch portions of said main circuit.

ROSSER L. WILSON.

REFERENCES CITED

The following references are of record in the file of this patent:

UNITED STATES PATENTS

| Number | Name | Date |
|---|---|---|
| 2,115,534 | Nash | Apr. 26, 1938 |
| 2,256,287 | McCune | Sept. 16, 1941 |
| 2,468,199 | Hines | Apr. 26, 1949 |